Dec. 7, 1954  F. FAHRNI  2,696,330
METHOD AND MACHINE FOR SPREADING CORE MATERIAL
Filed Jan. 9, 1951  5 Sheets-Sheet 3

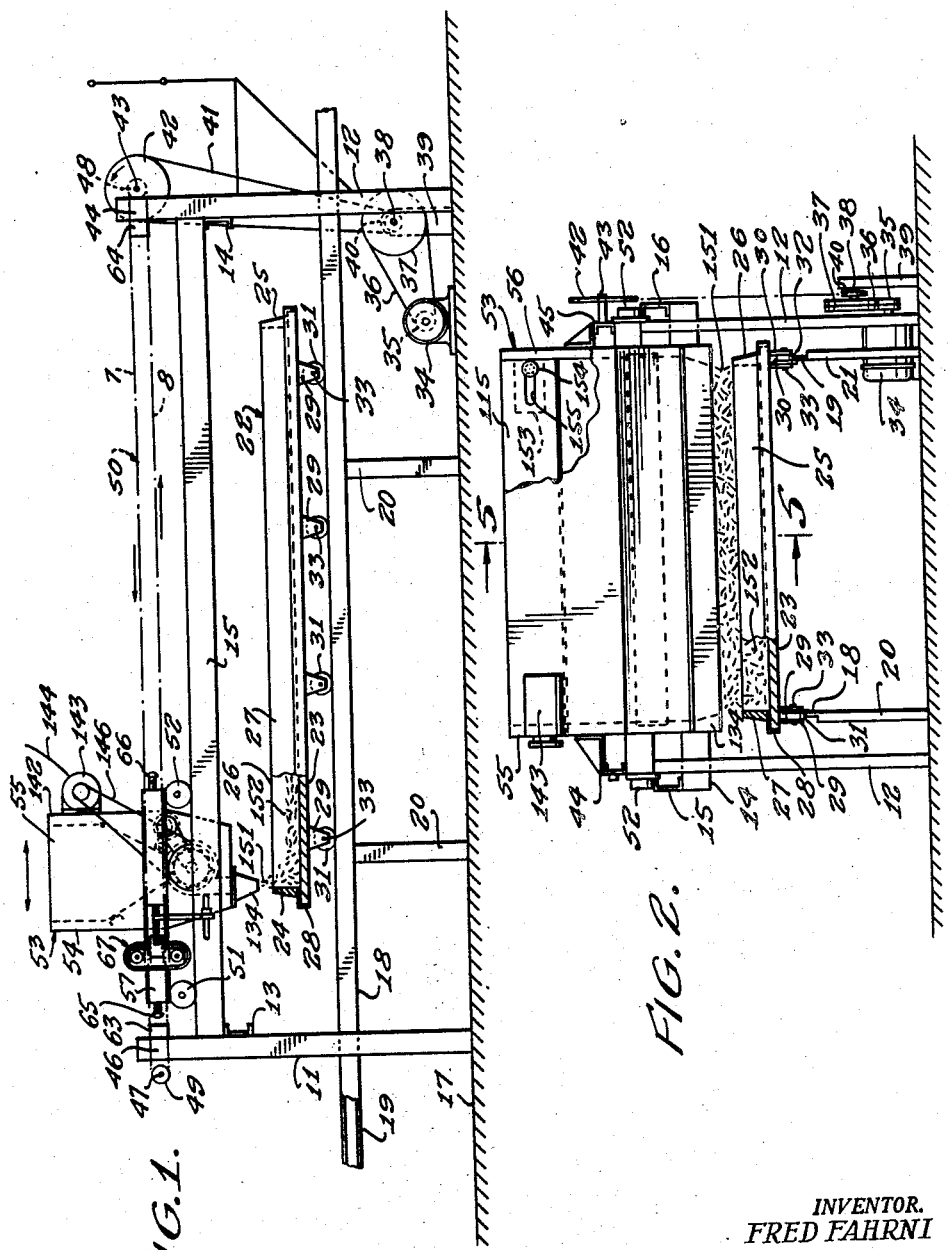

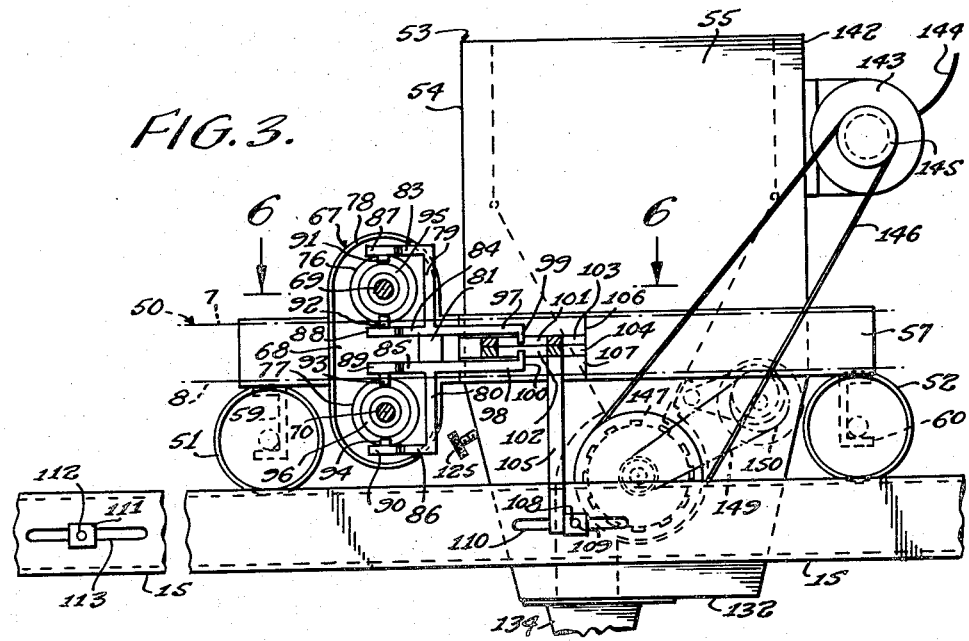
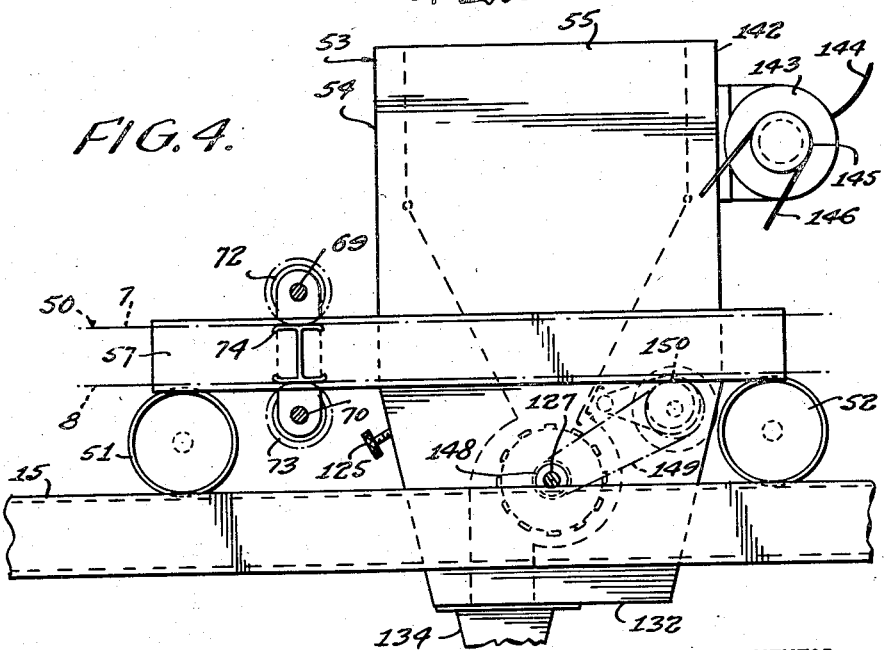

INVENTOR.
FRED FAHRNI.
BY *James M. Heilman*
ATTORNEY.

Dec. 7, 1954 F. FAHRNI 2,696,330
METHOD AND MACHINE FOR SPREADING CORE MATERIAL
Filed Jan. 9, 1951 5 Sheets-Sheet 4
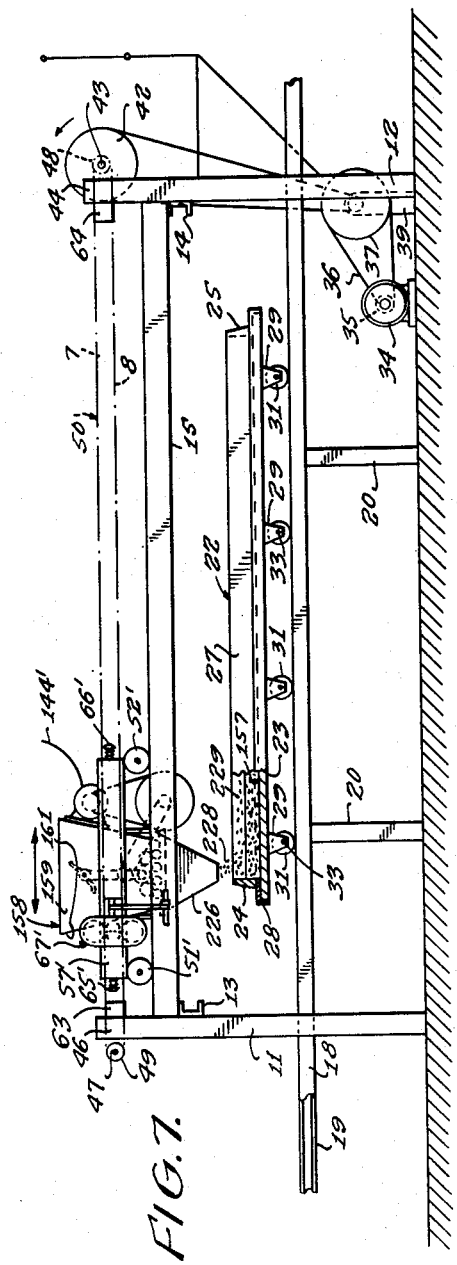
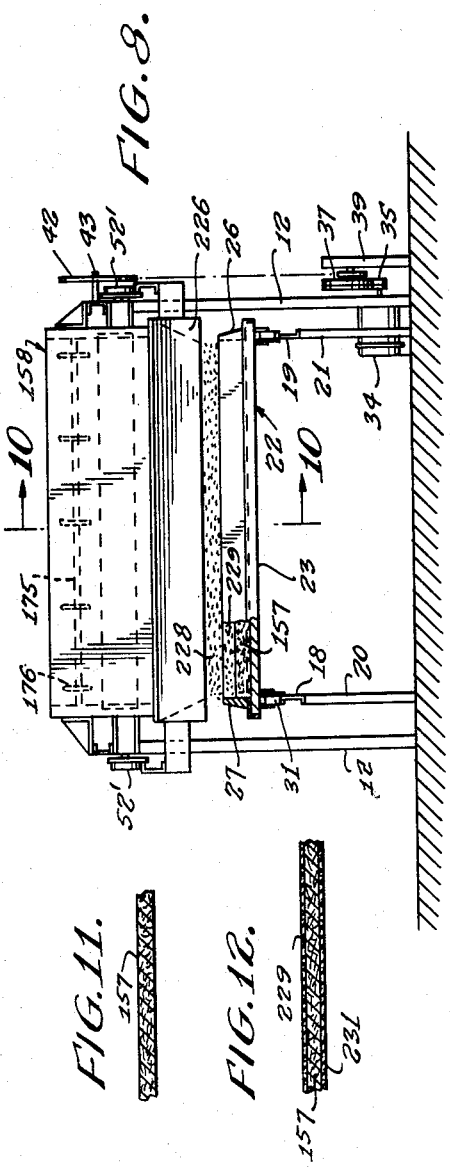
INVENTOR.
FRED FAHRNI
BY James M. Heilman
ATTORNEY Dec. 7, 1954  F. FAHRNI  2,696,330
METHOD AND MACHINE FOR SPREADING CORE MATERIAL
Filed Jan. 9, 1951  5 Sheets-Sheet 5

INVENTOR.
FRED FAHRNI
BY
James M. Heilman
ATTORNEY

United States Patent Office 2,696,330
Patented Dec. 7, 1954

2,696,330

METHOD AND MACHINE FOR SPREADING CORE MATERIAL

Fred Fahrni, Zurich, Switzerland

Application January 9, 1951, Serial No. 205,109

7 Claims. (Cl. 222—196)

This invention relates to scattering, spreading and distributing methods and machines, and particularly to chip and shaving scattering, spreading and distributing machines for spreading and distributing layers of shavings, chips and fragments of wood and other materials on a tray or other receiving surface.

There has been filed concurrently with the filing of the present application by the same inventor, two other applications now bearing Serial Nos. 205,108 and 205,110 and entitled "Operating Mechanisms for Spreading Machines" and "Method and Apparatus for Surface Material Spreading," respectively, each of which discloses and claims subject matter which is disclosed but not claimed in the present application.

The main object of my present invention is to provide a method and means for spreading, distributing and depositing single or multiple layers of wood or other shavings, chips and/or fragments upon an appropriate receiving surface preparatory to compressing the deposited material into boards, panels, slabs and sheets of composite wood or the like.

Another object of my invention is to provide a layer distributing and depositing machine of the character indicated which has a supply hopper for initially receiving the material to be spread and deposited, together with movable means for positively ensuring the spreading of a uniform deposit of the material on a shiftable receiving tray adapted to be displaced from the receiving position to an appropriatte position for compressing the deposited material by suitable means.

A further object of my invention is to provide a machine as indicated which is capable of taking at least two forms generally operating in similar manner, but in which one form is particularly adapted for depositing chips and fragments of wood to form a core body or intermediate layer of a panel or slab, while the other form is especially suited for depositing shavings and thin pieces of wood to form surface layers of the panels or slabs intended to be formed.

In other words the invention involves a core material spreading machine for depositing chips and fragments of wood and the like in layer form preparatory to compressing the deposited material into a coherent board or panel core, the machine including substantially horizontal guide means, a travelling material-depositing unit freely movable along the guide means, a material-receiving member disposed below the unit and being of sufficient length to extend beneath the entire path of travel of the travelling material-depositing unit for receiving the material therefrom layer by layer on the material-receiving member, the travelling material-depositing unit comprising a hopper having a bottom opening, a movable material distributing member operably mounted in the lower portion of the travelling material-depositing unit in effective position to control escape of material by gravity from the bottom opening of the hopper, means upon the hopper for operating the movable distributing member, and independent means for propelling the travelling material-depositing unit as a whole back and forth on the guide means above the material-receiving member.

The invention also involves more specifically a core material spreading machine for depositing chips and fragments of wood and the like in layer form preparatory to compressing the deposited material into a coherent board or panel core, the machine including a pair of supporting rails of predetermined length, a removable elongated material-receiving member forming a tray disposed substantially parallel to the rails, a travelling material-distributing unit movably supported on the rails above the tray for depositing the material on the tray layer by layer, and comprising a hopper for initially receiving a charge of the material having two opposite side walls, a pair of front and rear walls connected thereto, a downwardly directed spout mounted between the hopper and the tray, one wall of the front and rear walls having a lower portion adjustable adjacent to the drum, a series of ribs spaced apart on the peripheral surface of the drum, a pendently movable lower wall portion upon the other of the front and rear walls terminating with its lower end adjacent to the drum, means for rotating the drum and simultaneously oscillating the pendently movable lower wall portion toward and away from the other lower wall portion of the front and rear walls, and additional means for propelling the travelling material-distributing unit back and forth in opposite directions along the rails.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a side elevation of a core material spreading machine made according to the invention and embodying certain salient features thereof in a practical form;

Fig. 2 is an end elevation of the same machine as seen from the right in Fig. 1;

Fig. 3 is an enlarged side elevation of a traveling material depositing unit of the machine of Figs. 1 and 2;

Fig. 4 is a similar enlarged side elevation of the same traveling unit with certain operating members removed to display relations of parts;

Fig. 7 is a side elevation similar to Fig. 1, illustrating a modification of the traveling unit thereof while the remaining portions of the machine are identical with those shown in Fig. 1;

Fig. 8 is an end elevation of the machine of Fig. 7 as seen from the right;

Fig. 11 is a section of the initial form of panel made according to the invention; and Fig. 12 is a section of the panel in a final stage of manufacture.

Throughout the views, the same reference numerals indicate the same or like parts.

Figure 5:
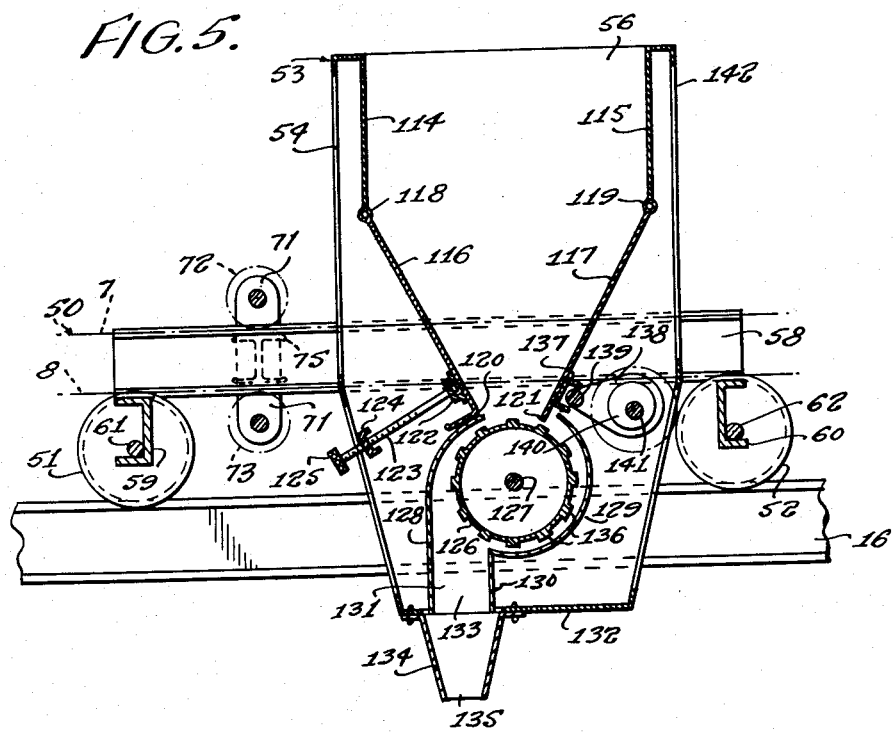
Fig. 5 is a similar enlarged view in vertical section as taken on line 5—5 in Fig. 2.
Figure 6:
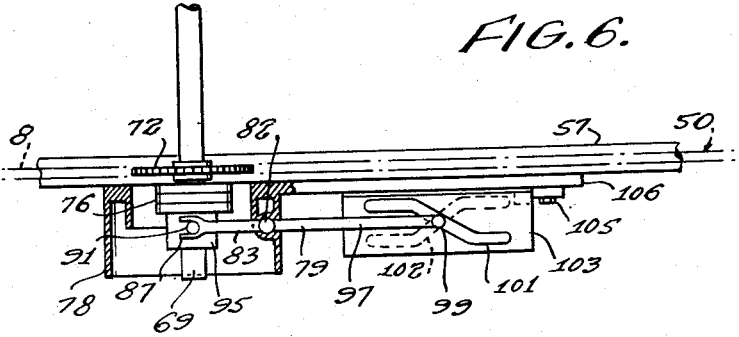
Fig. 6 is a partial horizontal section and partial top plan view taken on line 6—6 in Fig. 3.
Figures 9, 10:
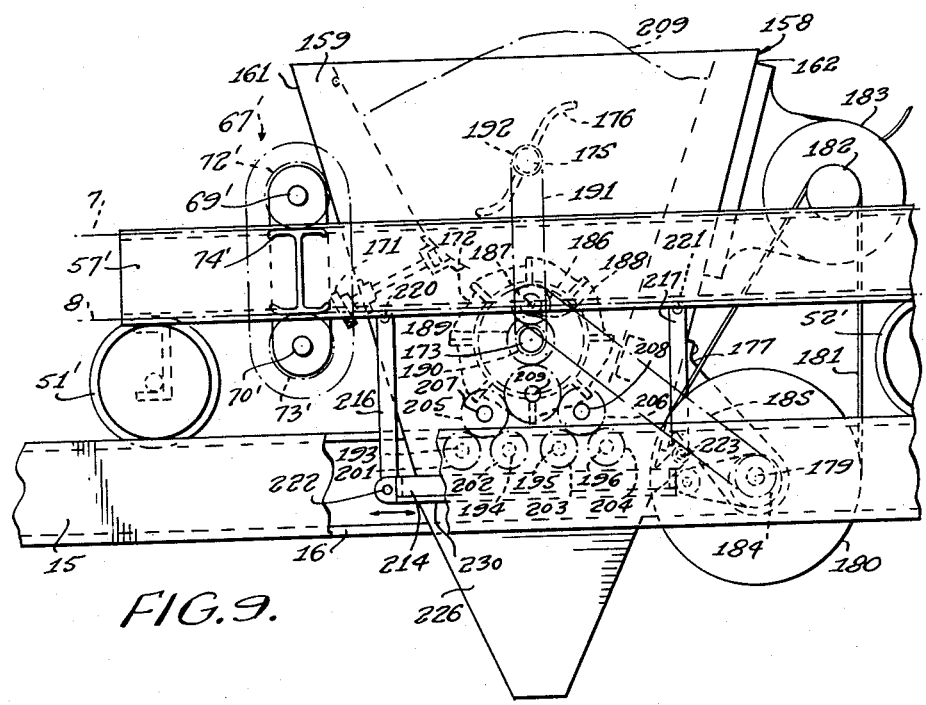
Fig. 9 is an enlarged side elevation of the modified form of traveling material spreading unit of the machine appearing in Figs. 7 and 8, with certain near parts removed for greater clarity in showing operating details.
Fig. 10 is a similar enlarged view in vertical section as taken on line 10—10 in Fig. 8.

When making boards, slabs, panels and sheets of composite compressed material, and especially when compressing wood chips, fragments and shavings to make compressed wooden panels and the like, it is very important to provide a uniform distribution of the chips, shavings or other material upon the entire extent of the surface upon which the material is to be pressed and formed. The reason is of course obvious, namely, that the finished panel or the like should be uniform in density, strength and thickness throughout, which result would not be achieved without initially effecting a substantially even spreading of the starting material in one or more layers over the mentioned surface, according to the ultimate thickness desired for the panel involved.

Another problem in this connection is to make a composite panel and the like having the main body or core thereof formed of wood chips and fragments to constitute bulk material, as it were, with the upper and lower sides faced with long fiber shavings to present substantially smooth outer surfaces of satisfactory finish and character which will be suitable to reinforce and lock the core material within the panel into a composite whole.

After duly considering these problems, and bearing the foregoing objects in mind, I have succeeded in producing an effective material-spreading machine and associated method for the present purpose as will now be set forth in detail.

Hence, in the practice of my invention and referring again to the drawings, a plurality of upright frame posts 11, 11, 12, etc., are secured together in pairs by cross-bars 13, 14 and into a substantially rectangular unit by two longitudinal rails 15, 16 rigidly secured to the cross-bars. The mentioned parts may be bolted, riveted, brazed or welded together, with the result that the frame is a rigid whole supported on the floor 17 and provided with a pair of supporting rails 15, 16 spaced uniformly apart and adapted to carry a traveling material-spreading unit, as will presently be explained more fully.

However, between the corner posts 11, 12 are arranged a second lower pair of rails 18, 19 supported on a plurality of relatively shorter posts 20, 21, etc., and extending to an appropriate panel press in one direction (not shown), as it forms no actual part of this invention. Upon the lower inside rails 18, 19 is shiftably supported a receiving panel tray generally indicated at 22, the rails extending in the direction opposite that previously mentioned to a storage space or chamber provided with additional trays for replacing tray 22 when the same has been run off to the compression zone for compressing the material deposited thereon.

The mentioned tray 22 consists of a flat bottom 23 provided with upwardly extending front, rear and side walls 24, 25, 26 and 27 secured thereto by an angle iron frame 28, while beneath the bottom a plurality of downwardly extending lugs 29, 39, etc. serve to pivotally support flanged wheels 31, 32 on pins or shafts 33 in such spaced apart relations that these wheels can roll in guided manner upon rails 18 and 19. The panel tray is thus capable of rolling from a normal loading position as shown in Figs. 1 and 2, along the lower rails to the pressure apparatus or zone as already intimated, and when freed from the pressed panel, this tray may be directly or ultimately returned or rerouted to the original position shown for receiving a fresh load of raw material. Ordinarily, no great effort is required to roll this receiving tray from one position to the other and therefore it may even be shifted by hand if desired.

Adjacent one of the corner posts 12 is fixed a driving motor 34 with its pulley 35 connected by belt 36 to a relatively larger pulley 37 fixed on a shaft 38, which in turn is rotatably supported on a bearing support 39, this shaft also having a relatively smaller pulley 40 mounted thereon for rotation therewith and with pulley 37. Pulley 40 is connected by a second belt 41 to a further larger pulley 42 fixed on transverse shaft 43 supported in bearing members 44, 45 secured upon rear posts 12, 12 a short distance above rails 15, 16. At the correspondingly opposite end of the frame structure, a similar pair of bearing members 46 are secured on posts 11, 11 for rotatably supporting another transverse shaft 47. On at least one end of each of shafts 43 and 47 are fixed chain sprockets 48, 49 interconnected by an endless chain 50, with the result that operation of motor 34 will provide a continuous forward travel from right to left of the upper length or section of the chain and a corresponding rearward travel toward the right of the lower length of the same chain.

As primarily shown in Figs. 1 and 2, upon side rails 15 and 16 are movably supported the flanged wheels 51, 52 of a traveling or reciprocating material-spreading unit generally indicated at 53. This unit has an outer frame 54 open at the top and provided along the two opposite side walls 55, 56 thereof with rigidly attached longitudinal side bars 57, 58 preferably secured at the ends by means of a pair of cross-bars 59, 60 (Figs. 3 and 5) that provide bearings for shafts 61, 62 on which wheels 51 and 52 are mounted. Thus the spreading or distributing unit is capable of traveling along rails 15 and 16 between the end cross-bars 63 and 64 supported on the corner posts 11 and 12. Upon the ends of the unit are provided resiliently mounted bumpers 65, 66 adapted to abut the end cross-bars 63, 64 and cushion stoppage of the unit during operation and also condition it for reversal of its travel on the rails. Before entering into the matter of the details of construction of this unit, specifically, the means for moving it and imparting a reciprocating movement thereto will first be outlined.

As best seen in Figs. 3 to 6, upon side bar 57 is mounted a clutch apparatus generally indicated at 67, primarily comprising a vertical bearing plate 68 forming bearing means for two sprocket shafts 69, 70 at one end of each, the other side bar 58 being provided with a corresponding bearing plate 71 secured thereto and serving as bearing means for the other ends of these shafts. The latter are provided at the extremities thereof with upper and lower sprockets 72 and 73 meshing with the upper and lower sections 7 and 8 of the one or two chains 50 running between end sprockets 48 and 49. In order to ensure proper meshing of sprockets 72 and 73 with the chain, the side bars 57 and 58 have chain abutments 74 and 75 fixed thereto by riveting, brazing or welding to support the chain while in mesh with the teeth on the sprockets and prevent escape of the links of said chains from engagement with the teeth of the mentioned sprockets.

Normally, these sprockets would rotate idly when chain 50 is in motion, due to the operation of motor 34, but by alternate braking or locking operation of the upper sprockets and then of the lower sprockets, the entire unit 53 will first follow the upper chain length 7 toward one end of the machine and then the lower lengths in the opposite direction. To effect this result in a controlled manner, clutch apparatus 67 includes a pair of clutch assemblies 76, 77 mounted on sprocket shafts 69 and 70 within a special clutch casing 78 forming part of bearing plate 68, with each clutch assembly adapted to be individually operated in alternation with the other by means of a pair of swivelling shifters 79, 80 pivotally mounted at 81 to swivel on vertical pivot pin 82.

The mentioned shifters consist of upper and lower clutch operating arms 83, 84, 85 and 86 provided with forks 87, 88, 89 and 90 engaging studs 91, 92, 93 and 94 on clutch collars 95 and 96. Upon shifters 79 and 80 are fixed rearwardly extending cam followers 97, 98 provided with cam following fingers 99, 100 engaging in cam slots 101, 102 in a pair of horizontal cam plates 103, 104 located slidably between cam followers 97 and 98 and prevented from being dissociated therefrom by engageemnt of fingers 99 and 100 in the cam slots. Cam slot 101 in upper cam plate 103 is inclined inwardly toward one end of the machine while cam slot 102 in lower cam plate 104 is inclined in the opposite direction, both cam slots being symmetrically disposed with respect to each other. Both cam plates are secured together and rigidly connected to a pendent cam shifter 105, the plates as a unit sliding forwardly and rearwardly between a pair of guides 106, 107 fixed on the side bar 57.

When the material-spreading unit 53 travels rearwardly toward the right, the lower end of cam shifter 105 encounters a block stop 108 adjustably fixed in position by a screw or bolt 109 extending through a longitudinal slot 110 in rail 15. The immediate effect is that cam plates 103, 104 are arrested by stoppage of member 105 while the unit still travels onward a short distance, forcing finger 99 of upper cam follower 97 to swing outwardly away from side bar 57 about pivot pin 82. Naturally, the upper clutch operating arms, 83, 84 with their forks 87, 88 are correspondingly swung inwardly and as these forks straddle studs 91, 92 of upper outer clutch collar 95, the upper clutch plates 76 are brought together into frictionally locked engagement. This suddenly stops rotation of upper sprocket shaft 69 with its sprocket 72, while meshing with upper chain sections 7 which are constantly traveling forward to the left and thereby reverse the travel of the distributing unit 53 upon rails 15, 16 so as to return this unit toward the left.

At the same time as upper clutch 76 becomes locked by outward shifting of upper cam follower 97, the lower cam slot 102 in cam plate 104 causes follower finger 100 and thereby lower cam follower 98 to swing inwardly about pivot pin 82 toward side bar 57. This, of course, correspondingly swings lower clutch operating arms 85, 86 outward with their forks 89, 90 straddling studs 93, 94 of lower clutch collar 96. As a result, the latter clutch collar is shifted outwardly, releasing the lower clutch and freeing lower sprockets 73 to mesh idly with the lower chain sections 8. Unit 53 then travels toward the left with upper chain sections 7 until cam shifter 105 encounters a second block stop 111 adjustably fixed in position by another screw or bolt 112 extending through a second longitudinal slot 113 in rail 15.

As the cam shifter meets stop 111, the cam plates immediately stop traveling while the unit continues a short distance, causing cam followers 97, 98 to operate and release the upper clutch and sprockets while frictionally locking the lower clutch and sprockets so that leftward travel of unit 53 with the upper chain section 7 terminates and rightward travel of the same unit immediately takes place. When the shifting member 105 thus encounters stops 108, 111, alternately, it immediately causes reversal of the travel of the distributing unit so that the latter continues to travel back and forth from one end of the rails 15, 16 to the other end as long as motor 34 continues to operate the one or more chains 50.

Thus far, the machine of Figs. 1 to 6 and the modification thereof, shown in Figs. 7 to 10 are substantially identical in all respects, including operation, the differences hereafter to be detailed arising from the nature of the material to be distributed or deposited in shiftable tray 22 and consequently of the construction of the spreading or distributing unit including proper facilities for handling the material involved in each case. For this reason only the numbers referring to unit 53 of Figs. 1 to 6 differ from those referring to the other unit of Figs. 7 to 10 in order to distinguish the units concerned.

Hence, continuing with the description of the machine illustrated in the first six figures for depositing wood chips and fragments to form a core or main body portion of a panel on tray 22, the frame 54 of unit 53 is furnished with a pair of interior transverse walls 114, 115 extending part way down from the top and secured between side walls 55, 56 to form the upper open end of a hopper. At the lower ends of walls 114, 115 are adjustably attached downwardly converging hopper walls 116, 117 connected to the upper walls by hinged members or rods 118, 119 in such manner that the lower ends 120, 121 of the hopper walls may be shifted toward or away from each other. Near the lower end 120 of hopper wall 116, the latter is connected at 122 with a rotatable end of an adjustable feed shaft or screw 123 extending in threaded engagement through a cross-bar 124 fixed within frame 54. The feed screw 123 is provided with a manually operable external knob 125 by which to rotate this screw in order to cause wall 116 to approach toward or recede from wall 117.

Below the lower ends of both walls 116 and 117 is mounted a ribbed distributing drum 126 on a drum shaft 127 rotatably mounted in the lower portions of side walls 55 and 56. Immediately beneath lower adjustable end 120 of hopper wall 116 is an outwardly arching depending wall 128 forming a divergent passage between the same and one side of drum 126 for passing material descending by gravity to the latter from the hopper above. The other side of the drum is partly encased within an arcuate shielding wall 129 secured between side walls 55, 56 which is, of course, likewise true of depending wall 128. Shielding wall 129 extends from the vicinity of lower end 121 of rear hopper wall 117 to a point beneath drum 126 where it joins the depending wall 130 fixed between walls 55 and 56 and spaced a short distance from the lower portion of wall 128 to form a downwardly directed passage 131 for the material dropping from the drum when the latter is rotated counterclockwise.

Both depending passage walls 128 and 130 terminate at the lower bottom wall 132 and are connected thereto so as to form a lower discharge opening 133 in this bottom wall. To the underside of the latter bottom wall is secured a discharge spout 134 in which the lower discharge port 135 is relatively narrow from front to back but from side to side is substantially as wide as the space between side walls 26 and 27 of shiftable tray 22.

As the material to be deposited in the tray is of so-called "bridge building" character, this tendency must, of course, be counteracted in order to promote an absolutely uniform and continuous downward feeding of the material through bottom opening 133 and distributing port 135. The ribbed form of drum 126 with its spaced ribs 136 fixed thereon, serves well to feed material which actually reaches the drum down into the passage 131, but for ensuring the continuous descent of the material in the hopper to this drum, the lower end 121 of hopper wall 117 is caused to swing or reciprocate constantly toward and away from the lower end 120 of the opposite hopper wall. In order to effect this result, wall 117 upon its lower external side is provided with a pivot connection 137 to which an eccentric link 138 is connected by pivot pin 139, the link being operably mounted on an eccentric 140 fixed on the eccentric shaft 141, which in turn is rotatably mounted in side walls 55 and 56. Rotation of this eccentric shaft will obviously cause the lower end of hopper wall 117 to swing back and forth on its hinge suspension 119 due to rotation of the eccentric 140, the contents of the hopper being thereby constantly disturbed and prevented from bridging across from wall 116 to wall 117. The immediate effect is that the material freely drops down upon drum 126, and during rotation of the latter is fed downwardly thereby in a uniform stream or supply determined in amount by the space between the drum and the upper end of fixed arcuate wall 128.

Upon the right end 142 of unit frame 54 is mounted an electric motor 143 having a drop cable 144 connected thereto from above and communicating with an appropriate current source. The motor has a driving pulley 145 connected by a belt 146 to a relatively larger pulley 147 fixed on drum shaft 127 for directly rotating the drum from the motor. On the drum shaft, but within pulley 147 is fixed a chain sprocket 148 connected by means of chain 149 to a relatively larger chain sprocket 150 fixed on eccentric shaft 141 already referred to. Thus, upon rotation of the drum 126 by motor pulley 145, the eccentric 140 is simultaneously rotated at a somewhat lower speed than that of the drum, thereby providing the mentioned constant swinging movement of hopper wall 117.

From the foregoing, it is evident that when electric current is supplied simultaneously to both motors 34 and 143, the material distributing unit 53 will travel back and forth from one end of the apparatus to the other, and is reversed at the end of each movement along the rails 15 and 16, while material such as wood chips and fragments fed into the hopper formed by walls 55, 56, 114, 115, 116 and 117 will be fed downwardly by drum 126 through spout 134 at 151 into shiftable panel tray 22 in such fashion that, during its reciprocating travel, the unit will deposit first in one direction and then in the opposite direction successive layers of material 152 until the desired quantity of this material has been deposited in the tray. When this result has been attained, the tray is promptly run along the lower rails 18 and 19 toward a pressure device (not shown) or to another machine, as will be explained, and another tray promptly rolled in position beneath unit 53 to be filled in similar manner to that already described.

It is, of course, obvious that panels of different widths may be made by depositing layers of broken wood material supplied by the hopper, if desired. For this purpose, the side wall 56 is provided interiorly with a pair of opposite lugs 153 secured to end walls 114 and 115 by means of screws or bolts 154 extending through horizontal slots 155 in walls 114 and 115 in such fashion that upon release of bolts 154 side wall 56 may be adjusted toward or away from opposite side wall 55. Of course the construction may also include similar adjustment for side wall 55, if so desired. When the unit 53 reciprocates along rails 15 and 16 from one end of the apparatus to the other, it encounters the bumpers 65, 66 which, due to their resilient construction tend to cushion the unit to a stop at each end and resiliently start the unit on its way back again from the individual bumper involved.

The coarse wood material 152 deposited in the manner described serves to form the inner or intermediate body portion of a composite panel board or sheet 157 (Fig. 11) and actually constitutes the bulk or main mass of the panel. In order to provide this panel with a smooth presentable surface adapted to receive a surface coating or finish applied thereto as would be done upon the surface of a piece of fine wood, for example, a different form of long fibre wood material such as wood shavings is preferably applied to one or both sides of the panel and is, of course, intended to form part and parcel thereof.

Thus, when panel 157 in its initial form is produced by pressing the mass of wood chips and the like in tray 22, the latter may be rolled along rails 15, 16 to a machine illustrated in Figs. 7 to 10. This second machine is substantially the same as that of Figs. 1 to 6 as already intimated, except for the travelling material distributing unit 53, which in the second machine is replaced by a wood shaving distributing unit generally indicated at 158. As all the remaining parts and also the general operation of the machine have already been sufficiently described, the construction and operation of this unit as such will now be specifically noted.

As previously brought out in connection with travelling unit 53, the unit 158 has a pair of parallel side bars 57', 58', provided with flanged wheels 51', 52' and transverse shafts as indicated at 61' mounted in cross bars as indicated at 59' interconnecting side bars 57', 58' into a rigid unit capable of running on rails 15, 16. Within the side bars, the two opposite hopper sides 159, 160 are mounted and connected to the front and rear outer unit walls 161, 162 of unit 158. Within the latter are mounted a fixed rear hopper wall 163 secured at the lower end thereof to a cross-bar 164 attached to the sides 159, 160, while opposite this rear hopper wall is pivotally mounted a pendently adjustable front hopper wall 165, being pivotally or hingedly suspended by means of a hinge structure or rod 166.

For adjustment of the mentioned front wall 165, the latter is connected to the inner operating end 167 of an adjusting feed screw 168 by means of a bracket 169 secured to wall 165, the feed screw extending threadedly through an interiorly threaded cross-bar 170 and out through front hopper wall 161. Externally of front wall 161, the feed or adjusting screw is provided with a knurled operating knob 171 by which to turn the feed screw and thereby adjust the lower end of suspended inner hopper wall 165 as desired. It is to be noted that this adjustable hopper wall is shorter than the opposite stationary hopper wall 163 in order to cooperate with a toothed feeding drum 172 fixed on a driven drum shaft 173 rotatably mounted in side walls 159, 160 and provided with a series of peripheral one way teeth 174 that clear the lower end of adjustable wall 165 in any adjusted position of the latter.

Between the intermediate portions of both hopper walls 163 and 165 is mounted a second shaft 175 above and parallel to drum shaft 173 and rotatably supported between side walls 159, 160. Upon this second shaft are secured a plurality of beater arms 176 located within the hopper structure for a purpose about to be explained. A pair of bearings 177, 178 are secured to the lower exterior portion of rear wall 162 for supporting an eccentric shaft 179 upon which is fixed a large pulley 180. To this pulley is connected a belt 181 extending from drive pulley 182 of an electric motor 183 secured to the upper exterior portion of rear wall 162.

Eccentric shaft 179 is provided with a chain sprocket 184 connected by a chain 185 to a second chain sprocket 186 rotatably mounted on a stud shaft 187 fixed on hopper side wall 159. The last mentioned sprocket 186 is rigid with a pinion 188 meshing with a relatively large gear 189 fixed on the end of drum shaft 173, which in turn is also provided with a chain sprocket 190. A second sprocket chain 191 interconnects sprocket 190 on the drum shaft with a further chain sprocket 192 fixed on beater shaft 175 for rotating beaters 176 simultaneously with the drum when the latter is driven through chain 185 from sprocket 184, through pinion 188, gear 189 meshing therewith, by way of pulley 180 through belt 181 from motor pulley 182 of motor 183.

Before detailing the progress of material through the distributing unit, two other features require mention; the first involving a series of feeding shafts 193, 194, 195, 196 and within the hopper structure provided with substantially square distributing rollers 197, 198, 199, 200. Upon the inner ends of these shafts are fixed pinions 201, 202, 203 and 204 meshing in pairs with two gears 205 and 206 rotatably mounted on stud shafts 207 and 208 fixed on side wall 159. These two gears 205 and 206 both mesh with a gear rotatable on a further stud shaft 209 and meshing in turn with the previously mentioned gear 189 a drum shaft 173.

Thus rotation of the drum when driven by motor 183 will be accompanied by rotation, not only of beaters 176, but also by rotation of all of the square rollers 197, 198, 199 and 200. If a quantity of wood shavings 209 is introduced into the hopper between walls 159, 160, 163 and 165 and the last mentioned wall adjusted by means of screw 168 to desired position, starting of driving motor 183 will cause beaters 176 to agitate the shavings constantly and urge them down towards drum 172, which rotates counter-clockwise and feeds a constant supply of shavings down to the square distributing rollers that also rotate by operation of the motor and pass the shavings down therebetween to drop on a sifting screen 210 immediately below the lower end 211 of the hopper structure proper.

Sifting screen 210 is provided with a frame 212 having a lug 213 at its rear end pivotally connected by an eccentric link 214 operatively to an eccentric 215 fixed on rotatable eccentric shaft 179 also driven by motor 183, as already outlined. Rotation of the eccentric shaft produces a constant horizontal reciprocation of the sifting screen, and in order to support this screen movably a group of pendent links 216, 217, 218 and 219 are pivotally mounted at the upper ends thereof to the unit side walls 159, 160, as for example, links 216 and 217 by means of pivot pins 220 and 221. At the lower ends, all four links are pivotally connected by pivot pins 222, 223, 224 and 225 to screen frame 212. The latter with its screen proper is thus swingably suspended and readily rocked back and forth beneath rollers 197, 198, 199 and 200 by operation of eccentric 215 to sift and drop the shavings down through a distributing spout 226 and its lower constricted opening 227 in the form of a constant stream 228 of material on the initially formed body panel 157 in tray 22 to form a surface layer 229 on this panel. This spout 226 may be secured by its upper flange 230 to screen frame 212 in order to swing or oscillate horizontally with the frame and its screen as illustrated, or it may be rigid with the upper hopper structure as in the case of the spout in Figs. 1 to 6, and the screen and frame then oscillating in a narrow horizontal space between the hopper structure and the spout, if desired.

Hence, when the lower motor 34 is started and the upper motor likewise, and assuming that tray 22 is in proper receiving position, the entire unit 158 will begin to travel back and forth along rails 15 and 16 while the feeding drum 172 feeds the shavings from the hopper supply 209 agitated by beaters 176 past the lower end of inner hopper wall 165 to the distributing rollers 197, 198, 199, 200, whence the material is dropped and scattered on screen 210, which during oscillation sifts the shavings down through spout 226 and its bottom opening on tray 22. As the initially pressed bottom panel is already in position in this tray, the shaving layer 229 deposits thereon until of the proper thickness, when the tray is rolled away to press this layer on the panel and cause it to adhere thereto.

When the panel has thus been provided with one surface layer 229, the panel may be turned over so that the deposited surface layer faces downward with the tray again disposed beneath the travelling unit 158, and the latter caused to deposit a further surface layer on the upper exposed side of the panel until of the proper thickness. When the tray is then rolled off to the compression apparatus, the newly deposited shaving layer 231 is pressed upon the panel and caused to adhere thereto to form the composite panel 157 provided with the two surface layers 229 and 231.

Of course, if desired, the originally formed panel need not be pressed into initial form before receiving the first shaving layer 229, but the tray simply provided with the bulk layer as first described in connection with Figs. 1 to 6, and the tray then rolled to the second apparatus and the first shaving layer applied, after which the tray may be rolled to the compression apparatus to press both deposited layers together to form the panel unit. The result is then that the panel merely has the body portion 157 and integral therewith the one surface layer 229, which may suffice for many purposes as a satisfactory panel. However, if the panel thus far made is turned over and the second shaving layer 231 applied and pressed thereon as already mentioned, a complete panel having both sides finished will result.

It is obvious that the wood chips and pieces deposited upon tray 22 in the first machine may be sprinkled or soaked with glue or some cementitious fluid or solution or even by plastic material, either of thermo setting or thermo plastic character, and the same is true of the shavings deposited on the tray in the second machine, such cementing adjuncts forming no part of the present invention and therefore being an optional feature in conjunction with the operation of the machines described.

From the foregoing, it is evident that a composite panel of wood or other material may be built up of one or more layers of compacted fragments, chips and shavings and the like, with no practical limit to the thickness of the panel or its layers except as limited by the capacity of the receiving tray and the dimensions of the apparatus involved.

The invention claimed below is also disclosed in U. S. applications Serial Nos. 205,108 and 205,110, both of which were filed on January 9, 1951.

Manifestly, variations may be resorted to and parts and features may be modified or used without others within the scope of the appended claims.

Having now fully described my invention, I claim:

1. A hopper having an open top and an open bottom, said hopper, comprising in combination, a pair of opposite side walls; a drum located in said hopper between said top and bottom thereof, said drum extending between said side walls and being mounted thereon for rotation within said hopper; a pair of opposite first end wall portions extending between said side walls and being located adjacent to said top of said hopper; a pair of second end wall portions hingedly connected to said first end wall portions, respectively, for movement toward and away from each other and converging toward said drum, each of said second end wall portions having a free end located adjacent one of a pair of spaced locations, respectively, on the periphery of said drum; adjusting means operatively connected to one of said second end wall portions for adjusting the position thereof with respect to the other of said second end wall portions; and reciprocating means operatively connected to said other second end wall portion for moving the same toward and away from said one second end wall portion and in substantially continuous adjacent relationship with said drum periphery.

2. A hopper having an open top and an open bottom, said hopper, comprising in combination, a frame; a pair of opposite side walls; a drum located in said hopper between said top and bottom thereof, said drum extending between said side walls and being mounted thereon for rotation within said hopper; a pair of opposite first end wall portions extending between said side walls and being located adjacent to said top of said hopper; a pair of second end wall portions hingedly connected to said first end wall portions, respectively, for movement toward and away from each other and converging toward said drum, each of said second end wall portions having a free end located adjacent one of a pair of spaced locations, respectively, on the periphery of said drum; adjusting means mounted on said frame and being operatively connected to one of said second end wall portions for adjusting the position thereof with respect to the other of said second end wall portions; and reciprocating means mounted on said frame and being operatively connected to said other second end wall portion for moving the same toward and away from said one second end wall portion and in substantially continuous adjacent relationship with said drum periphery.

3. A hopper having an open top and an open bottom, said hopper, comprising in combination, a frame; a pair of opposite side walls; a drum located in said hopper between said top and bottom thereof, said drum extending between said side walls and being mounted thereon for rotation within said hopper; a pair of opposite first end wall portions extending between said side walls and being located adjacent to said top of said hopper; a pair of second end wall portions hingedly connected to said first end wall portions, respectively, for movement toward and away from each other and converging toward said drum, each of said second end wall portions having a free end located adjacent one of a pair of spaced locations, respectively, on the periphery of said drum; adjusting means mounted on said frame and being operatively connected to one of said second end wall portions for adjusting the position thereof with respect to the other of said second end wall portions; and reciprocating means mounted on said frame and being operatively connected to said other second end wall portion for moving the same toward and away from said one second end wall portion and in substantially continuous adjacent relationship with said drum periphery, said reciprocating means comprising an eccentric disc rotatably mounted on said frame and a link connected at one end to said disc and being pivotally connected at an opposite end to said other second end wall portion.

4. A hopper having an open top and an open bottom, said hopper, comprising in combination, a pair of opposite side walls; a drum located in said hopper between said top and bottom thereof, said drum extending between said side walls and being mounted thereon for rotation within said hopper; a pair of opposite first end wall portions extending between said side walls and being located adjacent to said top of said hopper; a pair of second end wall portions hingedly connected to said first end wall portions, respectively, for movement toward and away from each other and converging toward said drum, each of said second end wall portions having a free end located adjacent one of a pair of spaced locations, respectively, on the periphery of said drum; adjusting means operatively connected to one of said second end wall portions for adjusting the position thereof with respect to the other of said second end wall portions; reciprocating means operatively connected to said other second end wall portion for moving the same toward and away from said one second end wall portion and in substantially continuous adjacent relationship with said drum periphery; a first plate located on one side of said drum, extending toward said open bottom of said hopper, and having a top end portion located between said free end of said one second end wall portion and said drum; and a second plate located on an opposite side of said drum, leading toward said open bottom of said hopper and having an arcuate portion located about said drum.

5. A hopper having an open top and an open bottom, said hopper, comprising in combination, a pair of opposite side walls; a drum located in said hopper between said top and bottom thereof, said drum extending between said side walls and being mounted thereon for rotation within said hopper; a pair of opposite first end wall portions extending between said side walls and being located adjacent to said top of said hopper; a pair of second end wall portions hingedly connected to said first end wall portions, respectively, for movement toward and away from each other and converging toward said drum, each of said second end wall portions having a free end located adjacent one of a pair of spaced locations, respectively, on the periphery of said drum; adjusting means operatively connected to one of said second end wall portions for adjusting the position thereof with respect to the other of said second end wall portions; reciprocating means operatively connected to said other second end wall portion for moving the same toward and away from said one second end wall portion and in substantially continuous adjacent relationship with said drum periphery; a first plate located on one side of said drum, extending toward said open bottom of said hopper, and having a top end portion located between said free end of said one second end wall portion and said drum; and a second plate located on an opposite side of said drum, leading toward said open bottom of said hopper and having an arcuate portion located about said drum and below the lowermost portion of the latter.

6. A hopper having an open top and an open bottom, said hopper, comprising in combination, a pair of opposite side walls; a drum located in said hopper between said top and bottom thereof, said drum extending between said side walls and being mounted thereon for rotation within said hopper, said drum having a plurality of projections on its outer surface also extending between said side walls; a pair of opposite first end wall portions extending between said side walls and being located adjacent to said top of said hopper; a pair of second end wall portions hingedly connected to said first end wall portions, respectively, for movement toward and away from each other and converging toward said drum, each of said second end wall portions having a free end located adjacent one of a pair of spaced locations, respectively, on the periphery of said drum; adjusting means operatively connected to one of said second end wall portions for adjusting the position thereof with respect to the other of said second end wall portions; reciprocating means operatively connected to said other second end wall portion for moving the same toward and away from said one second end wall portion and in substantially continuous adjacent relationship with said drum periphery; a first plate located on one side of said drum, extending toward said open bottom of said hopper, and having a top end portion located between said free end of said one second end wall portion and said drum; and a second plate located on an opposite side of said drum, leading toward said open bottom of said hopper and having an arcuate portion located about said drum and below the lowermost portion of the latter.

7. A hopper having an open top and an open bottom, said hopper, comprising in combination, a pair of opposite side walls; a drum located in said hopper between said top and bottom thereof, said drum extending between said side walls and being mounted thereon for rotation within said hopper, said drum having a plurality of projections on its outer surface also extending between said side walls; a pair of opposite first end wall portions extending between said side walls and being located adjacent to said top of said hopper; a pair of second end wall portions hingedly connected to said first end wall portions, respectively, for movement toward and away from each other and converging toward said drum, each of said second end wall portions having a free end located adjacent one of a pair of spaced locations, respectively, on the periphery of said drum; adjusting means operatively connected to one of said second end wall portions for adjusting the position thereof with respect to the other of said second end wall portions; reciprocating means operatively connected to said other second end wall portion for moving the same toward and away from said one second end wall portion and in substantially continuous adjacent relationship with said drum periphery; a first plate located on one side of said drum, extending toward said open bottom of said hopper, and having an arcuate top end portion located about said drum between said free end of said one second end wall portion and said drum; and a second plate located on an opposite side of said drum, leading toward said open bottom of said hopper and having an arcuate portion located about said drum, said second plate having a top end located on the opposite side of said other second end wall portion from said one second end wall portion and below the lowermost portion of the latter.

References Cited in the file of this patent

UNITED STATES PATENTS

| Number | Name | Date |
| --- | --- | --- |
| 301,020 | Waak et al. | June 24, 1884 |
| 447,072 | Huntley | Feb. 24, 1891 |
| 684,346 | Bowsher | Oct. 8, 1901 |
| 963,715 | Kingsbury et al. | July 5, 1910 |
| 1,101,060 | Clark | June 23, 1914 |
| 1,726,511 | Henry et al. | Aug. 27, 1929 |
| 1,728,928 | Crowell | Sept. 24, 1929 |
| 1,859,878 | Lockwood | May 24, 1932 |
| 1,891,764 | Henderson | Dec. 20, 1932 |
| 1,905,975 | Thomas | Apr. 25, 1933 |
| 1,990,634 | Brown et al. | Feb. 12, 1935 |
| 2,004,936 | Dorn et al. | June 18, 1935 |
| 2,171,949 | Roca et al. | Sept. 5, 1939 |
| 2,230,880 | Brown | Feb. 4, 1941 |
| 2,320,702 | Marchese et al. | June 1, 1943 |
| 2,320,728 | Hume | June 1, 1943 |
| 2,343,938 | Strong | Mar. 14, 1944 |
| 2,381,269 | Elmendorf et al. | Aug. 7, 1945 |
| 2,542,025 | Goss | Feb. 20, 1951 |
| 2,552,093 | Gallbach et al. | May 8, 1951 |